United States Patent
Chen

(10) Patent No.: US 11,423,880 B2
(45) Date of Patent: Aug. 23, 2022

(54) METHOD FOR UPDATING A SPEECH RECOGNITION MODEL, ELECTRONIC DEVICE AND STORAGE MEDIUM

(71) Applicant: GUANGDONG OPPO MOBILE TELECOMMUNICATIONS CORP., LTD., Guangdong (CN)

(72) Inventor: Yan Chen, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 233 days.

(21) Appl. No.: 16/532,786

(22) Filed: Aug. 6, 2019

(65) Prior Publication Data

US 2020/0051548 A1 Feb. 13, 2020

(30) Foreign Application Priority Data

Aug. 8, 2018 (CN) .......................... 201810898094.7

(51) Int. Cl.
*G10L 15/06* (2013.01)
*G10L 15/07* (2013.01)

(52) U.S. Cl.
CPC ............ *G10L 15/063* (2013.01); *G10L 15/07* (2013.01); *G10L 2015/0635* (2013.01)

(58) Field of Classification Search
CPC ................... G10L 15/063; G10L 15/07; G10L 2015/0635
See application file for complete search history.

(56) References Cited

U.S. PATENT DOCUMENTS 5,488,652 A * 1/1996 Bielby ................. G10L 15/063
379/213.01
6,014,624 A 1/2000 Raman
(Continued)

FOREIGN PATENT DOCUMENTS

CN 103165129 6/2013
CN 103247291 8/2013
(Continued)

OTHER PUBLICATIONS

Wikipedia contributors. (Jun. 12, 2018). Configuration file. In Wikipedia, The Free Encyclopedia. Retrieved 23:41, Sep. 15, 2021, from https://en.wikipedia.org/w/index.php?title=Configuration_file&oldid=845498449 (Year: 2018).*

(Continued)

*Primary Examiner* — Michelle M Koeth
(74) *Attorney, Agent, or Firm* — Hodgson Russ LLP

(57) ABSTRACT

The embodiments of the present application provide a method for updating a speech recognition model a storage medium and an electronic device. The method includes: detecting whether the speech recognition algorithm is updated; and updating the speech recognition model when the speech recognition algorithm has been updated. Wherein, the voice information is recognized by the electronic device based on the speech recognition algorithm and the speech recognition model. In the method for updating a speech recognition model, when the electronic device detects that the speech recognition algorithm has been updated, the electronic device can update the speech recognition model.

17 Claims, 6 Drawing Sheets

(56) References Cited

U.S. PATENT DOCUMENTS

| | | | | |
|---|---|---|---|---|
| 7,496,693 | B2* | 2/2009 | Cook | G10L 15/30 |
| | | | | 710/10 |
| 8,135,589 | B1 | 3/2012 | Reding et al. | |
| 8,583,432 | B1 | 11/2013 | Biadsy et al. | |
| 9,633,652 | B2* | 4/2017 | Kurniawati | G10L 15/00 |
| 9,767,803 | B1* | 9/2017 | Wakeford | G10L 15/28 |
| 10,649,727 | B1* | 5/2020 | Douglas | G06F 3/167 |
| 2002/0156626 | A1* | 10/2002 | Hutchison | G10L 15/16 |
| | | | | 704/231 |
| 2005/0137866 | A1 | 6/2005 | Dow et al. | |
| 2006/0085183 | A1* | 4/2006 | Jain | G10L 17/26 |
| | | | | 704/233 |
| 2007/0288242 | A1* | 12/2007 | Spengler | G10L 15/20 |
| | | | | 704/275 |
| 2008/0167860 | A1* | 7/2008 | Goller | G06F 8/65 |
| | | | | 704/201 |
| 2009/0125899 | A1 | 5/2009 | Unfried | |
| 2016/0239476 | A1 | 8/2016 | Huang | |
| 2017/0365251 | A1* | 12/2017 | Park | G10L 15/02 |
| 2018/0286401 | A1* | 10/2018 | Oh | G10L 15/063 |
| 2019/0362726 | A1* | 11/2019 | Choi | G10L 17/22 |

FOREIGN PATENT DOCUMENTS

| | | |
|---|---|---|
| CN | 104538031 | 4/2015 |
| CN | 104991713 | 10/2015 |
| CN | 105122354 | 12/2015 |
| CN | 105575389 | 5/2016 |
| CN | 105976813 | 9/2016 |
| CN | 106601236 | 4/2017 |
| CN | 103680495 | 5/2017 |
| CN | 107610702 | 1/2018 |
| CN | 107667399 | 2/2018 |
| WO | 0195600 | 12/2001 |

OTHER PUBLICATIONS

Wikipedia contributors, (Nov. 8, 2017) "Microsoft Speech API" In Wikipedia, The Free Encyclopedia (Retrieved May 22, 2021, from https://en.wikipedia.org/w/index.php?title=Microsoft_Speech_API&oldid=809379069.) (Year: 2017).*

EPO, Office Action for EP Application No. 19190689.0, dated Nov. 6, 2019.

WIPO, English translation of the ISR and WO for PCT/CN2019/099671, Oct. 31, 2019.

EPO, Communication for EP Application No. 19190689.0, dated Apr. 21, 2021.

EPO, Office Action for EP Application No. 19190689.0, dated Jul. 19, 2021.

CNIPA, First Office Action for CN Application No. 201810898094.7, dated Nov. 1, 2021.

IPI, Office Action for IN Application No. 201914032136, dated Dec. 21, 2020.

* cited by examiner

METHOD FOR UPDATING A SPEECH RECOGNITION MODEL, ELECTRONIC DEVICE AND STORAGE MEDIUM

CROSS-REFERENCE TO RELATED APPLICATION

This application claims priority to Chinese Patent Application No. 201810898094.7, filed Aug. 8, 2018, the entire disclosure of which is incorporated herein by reference.

TECHNICAL FIELD

The present disclosure relates to a field of speech recognition technology, and particularly to a method for updating a speech recognition model, a storage medium and an electronic device.

BACKGROUND

With the rapid development of electronic technology, more and more functions are developed in electronic devices such as smart phones. For example, a user can control an electronic device by voice to perform various functional applications of the electronic device.

SUMMARY

The embodiments of the present disclosure provide a method for updating a speech recognition model, a storage medium and an electronic device, and can improve the accuracy of the voice recognition of the electronic device.

The embodiments of the present disclosure provide a method for updating a speech recognition model, applied to an electronic device, the method includes the followings.

Whether a speech recognition algorithm has been updated is detected, wherein the speech recognition algorithm is used to recognize input voice information based on the speech recognition model. The speech recognition model is updated when the speech recognition algorithm has been updated.

The embodiments of the present disclosure provide a storage medium, with a computer program stored therein, wherein the above method is implemented when executing the computer program by a computer.

The embodiments of the present disclosure provide an electronic device. The electronic device includes a processor and a memory and a computer program stored in the memory, wherein the processor is configured to perform the above method by calling the computer program stored in the memory.

BRIEF DESCRIPTION OF THE DRAWINGS

In order to more clearly illustrate the technical solutions in the embodiments of the present disclosure, the drawings used in the embodiments will be briefly described below. Obviously, the drawings in the following are only some embodiments of the present disclosure, and those skilled in the art can obtain other drawings according to the drawings without any creative work.

DETAILED DESCRIPTION OF EMBODIMENTS

The technical solutions in the embodiments of the present disclosure will be clearly and completely described in the following with reference to the accompanying drawings in the embodiments. It is apparent that the described embodiments are only a part of the embodiments of the present disclosure, and not all of them. Based on the embodiments in the present disclosure, all other embodiments obtained by those skilled in the art without creative efforts are within the scope of the present disclosure.

The descriptions and claims of this disclosure, as well as the terms "first", "second", "third" and so on (if exits) in the above figures are used to distinguish similar objects, rather than to describe a particular order or priority order. It should be understood that the objects described in this way can be interchanged in appropriate circumstance. In addition, the terms "include" and "have" and any variation of them are intended to cover exclusive inclusions. For example, a process or a method that includes a series of operations, or a device, an electronic device, or a system that contains a series of modules or units. The process, method, device, electronic device, and the system are not limited to include operations, modules or units those clearly listed, and may include operations or modules that are not explicitly listed. Other operations, modules or units inherent to such processes, methods, device, electronic devices or systems may also be included.

Figure 1:
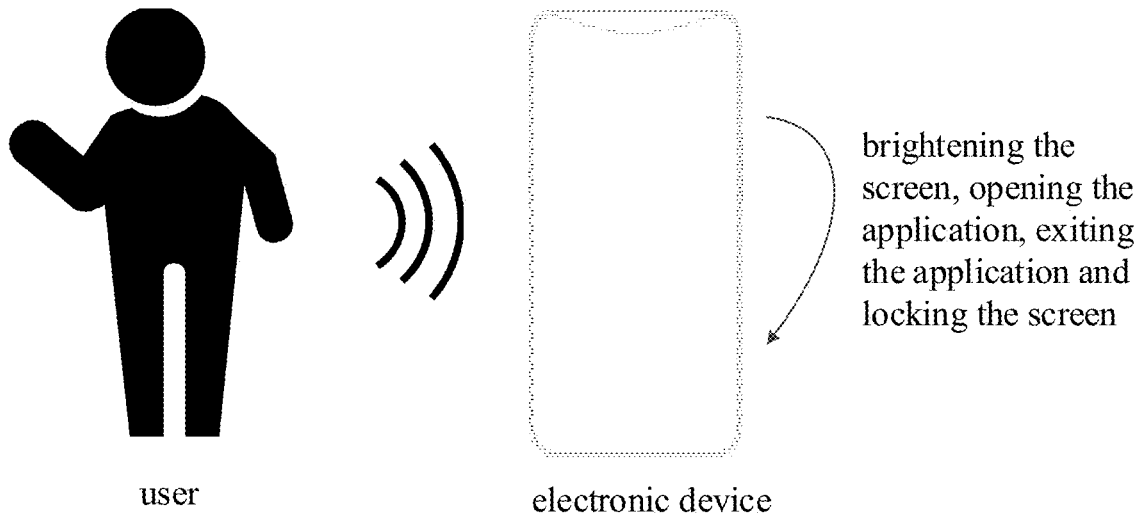
FIG. 1 is a schematic view of a user controlling an electronic device by voice.

Referring to FIG. 1, FIG. 1 is a schematic view of a user controlling an electronic device by voice. A piece of voice can be outputted from the user, the electronic device can collect the voice as input voice information. The electronic device can compare the input voice information collected by the electronic device with the speech recognition model stored in the electronic device. The electronic device can recognize control instructions from the input voice information when the input voice information matches the speech recognition model. The electronic device can perform the operations corresponding to the control instructions, such as brightening the screen, opening the application, exiting the application and locking the screen and so on, thereby it can realize the voice control of the electronic device by the user.

The present disclosure provides an embodiment of the method for updating a speech recognition model, which can be applied to electronic devices. The electronic devices can be smart phones, tablets, game devices, AR (Augmented Reality) devices, automobiles, data storage devices, audio playback devices, video playback devices, laptop computers, desktop computing devices and so on.

Figure 2:
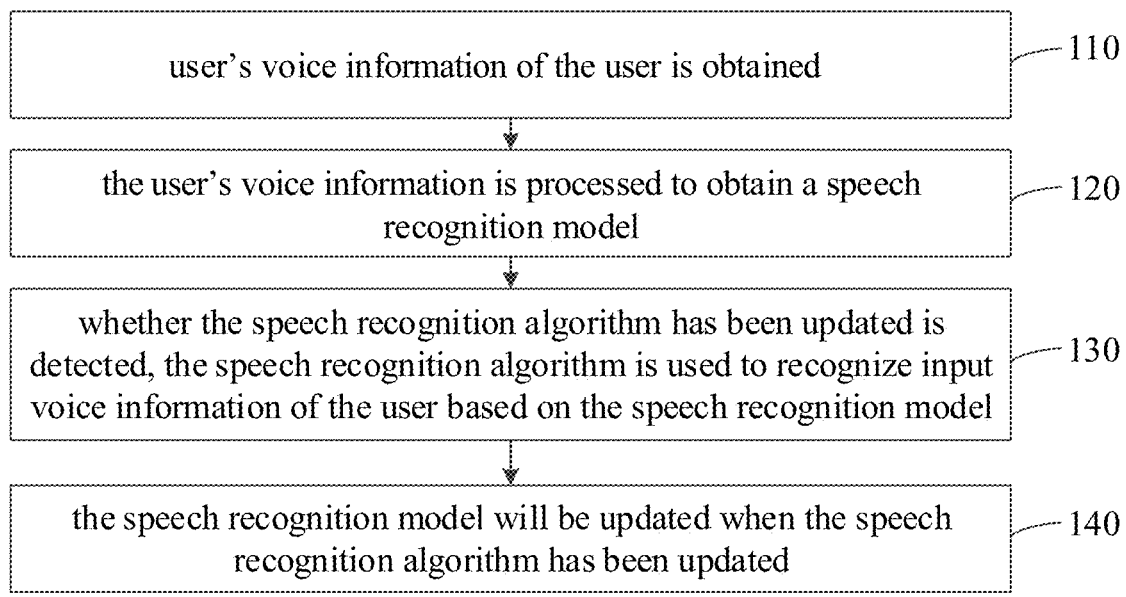
FIG. 2 is a first schematic flowchart view of a method for updating a voice recognition model according to an embodiment of the present disclosure.

As shown in FIG. 2, the method for updating a speech recognition model can include the following operations.

In operation 110, user's voice information of the user is obtained.

The electronic device can recognize the voice of the user when the user controls the electronic device by input voice. The user's voice information is collected by the electronic device to generate a speech recognition model, when the user first starts the voice control function. The speech recognition model is used to recognize the user's voice.

Wherein, a voice information acquisition module is disposed in the electronic device. For example, the voice information acquisition module can include a microphone. The electronic device can obtain voice information of the user by the microphone as the input voice information.

The electronic device can prompt the user to input voice when a speech recognition function or a speech recognition application of the electronic device is first activated. The electronic device can obtain the voice of the user by the microphone, and define the voice as the user's voice information. The user's voice information is used to process to obtain the speech recognition model.

Wherein, the user's voice information can be voice information corresponding to a preset paragraph of text. For example, the user's voice information can include the sentences such as "the weather is really good today", "this is my smartphone" and so on.

For example, when the user first uses the speech recognition function or the speech recognition application of the electronic device, the electronic device can prompt the user to read "the weather is really good today", which is displayed on the display screen. The electronic device collects the voice information reading by the user as the user's voice information. In addition, the electronic device can guide the user to read the preset text many times, so that the voice information the user reads many times can be collected as the user's voice information.

In operation 120, the user's voice information is processed to obtain a speech recognition model.

The electronic device can process the user's voice information to obtain the speech recognition model after the electronic device obtains the user's voice information. In some embodiments, the electronic device can process the user's voice information based on a speech recognition algorithm.

For example, the electronic device can extract voiceprint features of the user from the user's voice information, and train the voiceprint features based on a preset training algorithm to obtain the speech recognition model. Thus, the speech recognition model is related to the voiceprint features of the user and can be used to recognize the input voice information of the user. Wherein, training the voiceprint features based on the speech recognition algorithm to obtain the speech recognition model, may be establishing the speech recognition model by processing the voiceprint features based on the speech recognition algorithm. The preset training algorithm is used to train or process the voiceprint features to obtain the speech recognition model. In some embodiments, the preset training algorithm can be the speech recognition algorithm.

In some embodiments, the electronic device can extract voiceprint features of the user from the user's voice information as the speech recognition model by the speech recognition algorithm.

In operation 130, whether the speech recognition algorithm has been updated is detected, the speech recognition algorithm is used to recognize input voice information of the user based on the speech recognition model.

The speech recognition algorithm is set in the electronic device. The speech recognition algorithm is used to recognize input voice information of the user based on the speech recognition model. That is, the electronic device can recognize the input voice information of the user based on the speech recognition algorithm and the speech recognition model.

For example, when a user wants to control the electronic device by voice, the user inputs a piece of voice information to the electronic device, such as "open wechat". The electronic device obtains the voice information of the user as the input voice information and compares the input voice information with the speech recognition model to determine whether the input voice information matches the speech recognition model or not. When the input voice information matches the speech recognition model, it indicates that the electronic device recognizes the input voice information of the user successfully. The electronic device can perform operation instructions corresponding to the input voice information.

Wherein, the speech recognition algorithm can be embedded in an operating system of the electronic device. For example, the speech recognition algorithm can be implemented by some code included in the operating system. Thereby the speech recognition algorithm may also be different when the operating system version is different. That is, there is a case where the speech recognition algorithm is updated.

The speech recognition algorithm can also be stored independently in the application of the electronic device. For example, a speech recognition application can be installed in the electronic device, and the speech recognition algorithm can be implemented by some code included in the speech recognition application. The speech recognition algorithm can also be different when the version of the speech recognition application is different. The speech recognition application is an application for speech recognition.

In this embodiment of the present disclosure, the electronic device can detect whether the speech recognition algorithm is updated. For example, the electronic device can detect whether the speech recognition algorithm is updated by detecting whether the operating system has been updated or the speech recognition application has been updated. The electronic device can determine the speech recognition algorithm has been updated when the speech recognition application has been updated.

In operation 140, the speech recognition model will be updated when the speech recognition algorithm has been updated.

Wherein, the electronic device can update the speech recognition model when the electronic device detects that the speech recognition algorithm is updated. So that the matching degree between the speech recognition model and the speech recognition algorithm can be higher, and the number of speech recognition failures is reduced, and the accuracy of speech recognition of the electronic device is improved.

In some embodiments, the electronic device can update the speech recognition model based on an updated speech recognition algorithm.

Figure 3:
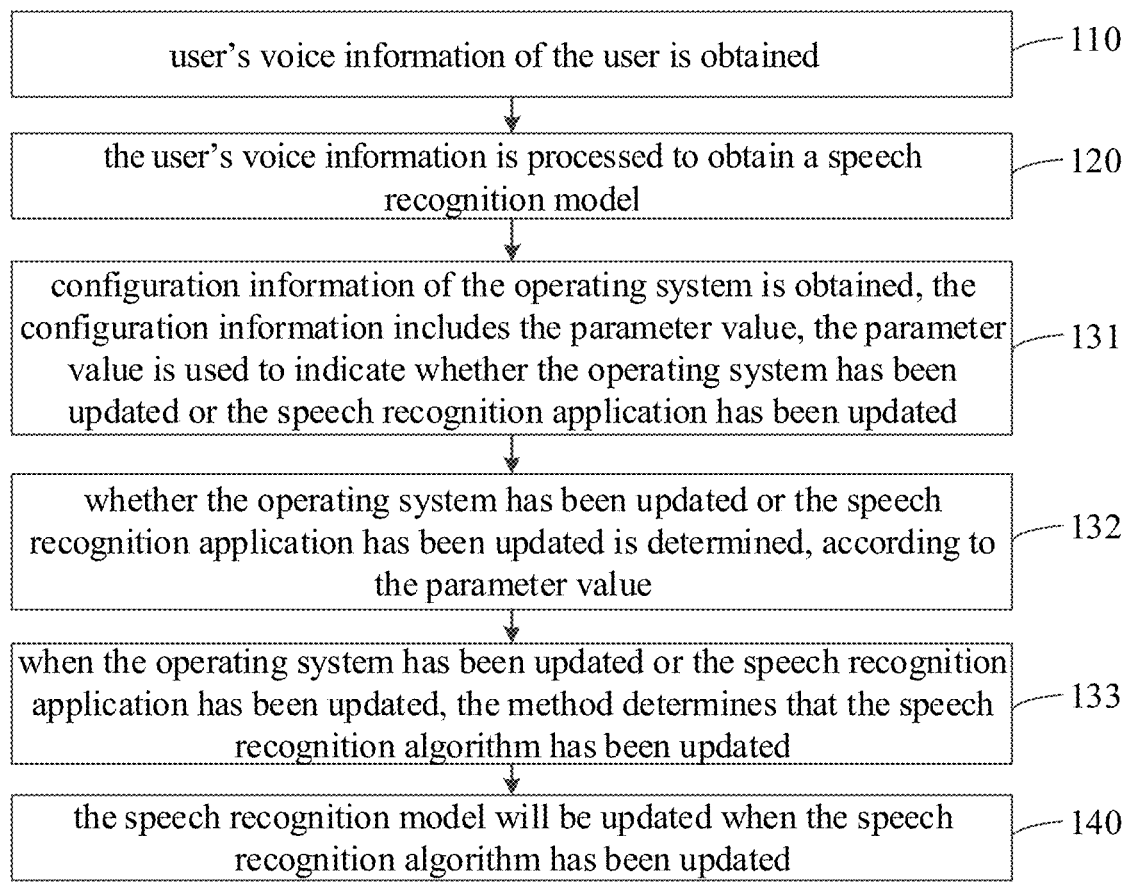
FIG. 3 is a second schematic flowchart view of a method for updating a voice recognition model according to an embodiment of the present disclosure.

In some embodiments, as shown in FIG. 3, the operation 130 of detecting whether the speech recognition algorithm has been updated includes the following operations.

In operation 131, configuration information of the operating system is obtained, the configuration information includes the parameter value, the parameter value is used to indicate whether the operating system has been updated or the speech recognition application has been updated.

In operation 132, whether the operating system has been updated or the speech recognition application has been updated is determined, according to the parameter value.

In operation 133, when the operating system has been updated or the speech recognition application has been updated, the method determines that the speech recognition algorithm has been updated.

Wherein, the configuration information is set in the operating system of the electronic device. The configuration information can be stored in the operating system as a separate configuration file. The configuration information includes the parameter value, the parameter value can be used to indicate whether the operating system has been updated or the speech recognition application has been updated. Wherein, the parameter value can include a first and a second parameter value, the first parameter value can be used to indicate whether the operating system has been updated, the second parameter value can be used to indicate whether the speech recognition application has been updated.

For example, the first parameter value can be used to indicate whether the operating system is updated. When the first parameter value is 1, it indicates that the operating system has been updated; when the first parameter value is 0, it indicates that the operating system is not updated.

As another example, the second parameter value can be used to indicate whether the speech recognition application is updated. When the second parameter value is 1, it indicates that the speech recognition application has been updated; when the second parameter value is 0, it indicates that the speech recognition application is not updated.

The electronic device can obtain the configuration information of the operating system and determine whether the operating system has been updated or the speech recognition application has been updated, according to the parameter value in the configuration information.

For example, when the first parameter value is used to indicate whether the operating system is updated, the electronic device can determine the operating system has been updated when the first parameter value in the configuration information obtained by the electronic device is 1. When the second parameter value is used to indicate whether the speech recognition application is updated, the electronic device can determine the speech recognition application has been updated when the second parameter value in the configuration information obtained by the electronic device is 1.

When the electronic device determines that the operating system or the speech recognition application has been updated, the electronic device can determine the speech recognition algorithm has been updated. The follow-up processes are continued by the electronic device. When the electronic determines that the operating system and the speech recognition application have not been updated, the process can be ended.

Figure 4:
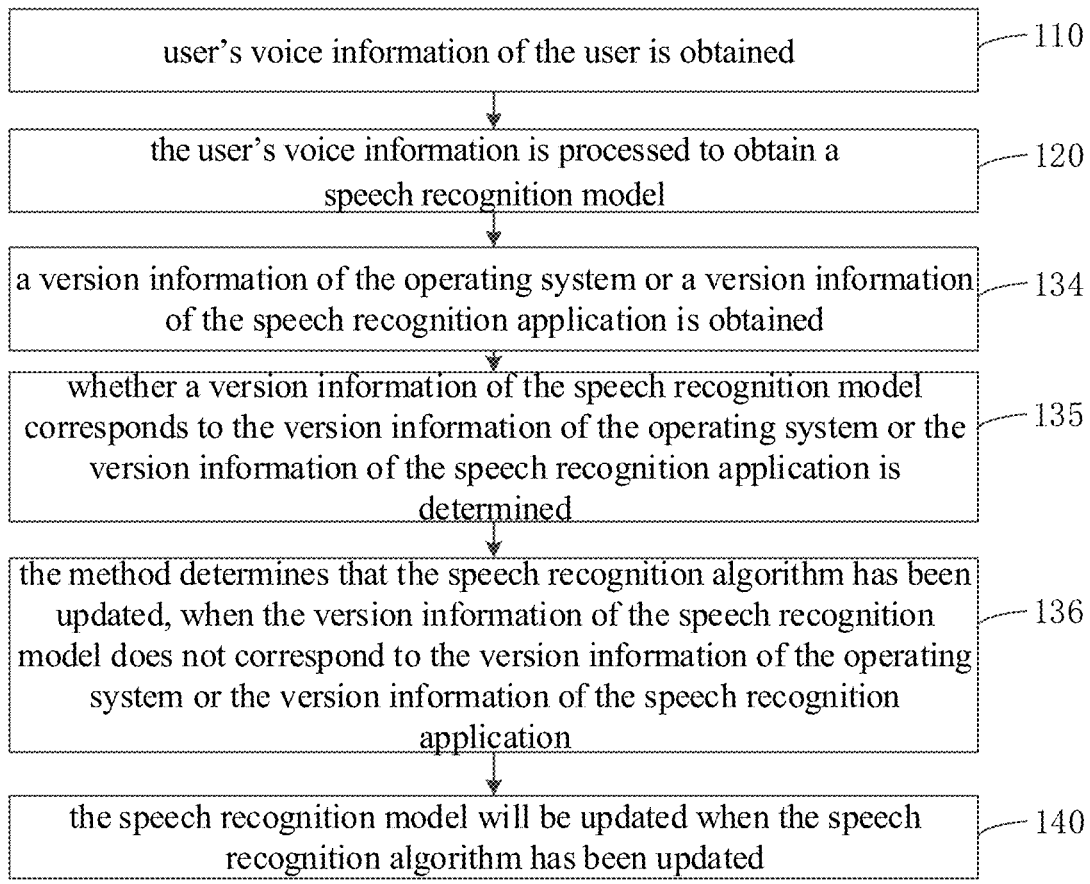
FIG. 4 is a third schematic flowchart view of a method for updating a voice recognition model according to an embodiment of the present disclosure.

In some embodiments, as shown in FIG. 4, operation 130 of detecting whether the speech recognition algorithm is updated includes the following operations:

In operation 134, a version information of the operating system or a version information of the speech recognition application is obtained.

In operation 135, whether a version information of the speech recognition model corresponds to the version information of the operating system or the version information of the speech recognition application is determined.

In operation 136, the method determines that the speech recognition algorithm has been updated, when the version information of the speech recognition model does not correspond to the version information of the operating system or the version information of the speech recognition application.

Each time the operating system of the electronic device is updated, the electronic device can store the version information of the operating system in the operating system. Each time the speech recognition application is updated, the electronic device can also store the version information of the speech recognition application in the operating system.

When the electronic device processes the user's voice information of the user and obtains the speech recognition model, the version information of the speech recognition model can be written in the speech recognition model. The version information of the speech recognition model can correspond to the version information of the operating system when the electronic device performs the user's voice information processing. For example, when the electronic device obtains the speech recognition model by processing the user's voice information, the version information of the operating system of the electronic device is 1.0.0.0, and the version information of the speech recognition model may be 1.0.0.1. The version information of the speech recognition model may also correspond to the version information of the speech recognition application when the electronic device performs the user's voice information processing. For example, when the electronic device obtains the speech recognition model by processing the user's voice information, the version information of the speech recognition application in the electronic device is 1.0.2.0, and the version information of the speech recognition model can be 1.0.2.1.

The electronic device can obtain the version information of the operating system or the version information of the speech recognition application, compare the version information of the speech recognition model with the version information of the operating system or the version information of the speech recognition application, in order to determine whether the version information of the speech recognition model corresponds to the version information of the operating system or the version information of the speech recognition application.

If the version information of the speech recognition model corresponds to the version information of the operating system, it indicates that the operating system has not been updated after the generation of the speech recognition model. At this time, the electronic device can end the process.

If the version information of the speech recognition model does not correspond to the version information of the operating system, it indicates that the operating system has been updated after the generation of the speech recognition mode. At this time, the electronic device can determine that the speech recognition algorithm has been updated. The electronic device continues the follow-up processing.

If the version information of the speech recognition model corresponds to the version information of the speech recognition application, it indicates that the speech recognition application has not been updated after the generation of the speech recognition model. At this time, the electronic device can end the process.

If the version information of the speech recognition model does not correspond to the version information of the speech recognition application, it indicates that the speech recognition application has been updated after the generation of the speech recognition mode. At this time, the electronic device can determine that the speech recognition algorithm has been updated. The electronic device continues the follow-up processing.

Figure 5:
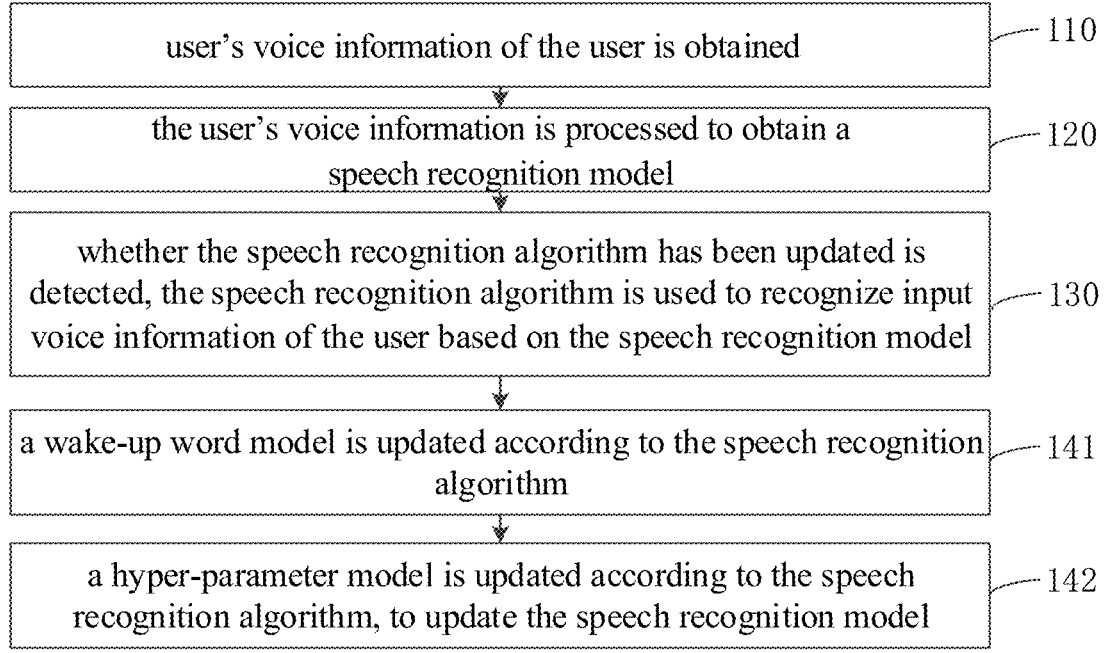
FIG. 5 is a fourth schematic flowchart view of a method for updating a voice recognition model according to an embodiment of the present disclosure.

In some embodiments, as shown in FIG. 5, the operation 140 of updating the speech recognition model includes the following operations.

In operation 141, a wake-up word model is updated according to the speech recognition algorithm.

In operation 142, a hyper-parameter model is updated according to the speech recognition algorithm, to update the speech recognition model.

Wherein, the speech recognition model includes a wake-up word model and a hyper-parameter model. The wake-up word model can include multiple wake-up words. The wake-up word is used to match the input voice information of the user, so that the electronic device performs the operation instructions in the input voice information of the user. The hyper-parameter model can include multiple hyper-parameters.

Furthermore, the speech recognition model can also include a voiceprint feature model. The voiceprint feature model includes voiceprint features of the user's voice information, that is, the voiceprint feature model includes voiceprint features of the user who reads the user's voice information.

When the electronic device determines that the speech recognition algorithm has been updated, the electronic device updates the wake-up word model according to the speech recognition algorithm, and updates the hyper-parameter model according to the speech recognition algorithm, so as to implement the updating of the speech recognition model. At this time, the electronic device may not update the voiceprint feature model, and keep the voiceprint feature model unchanged, that is, retain the voiceprint feature model in the speech recognition model.

Figure 6:
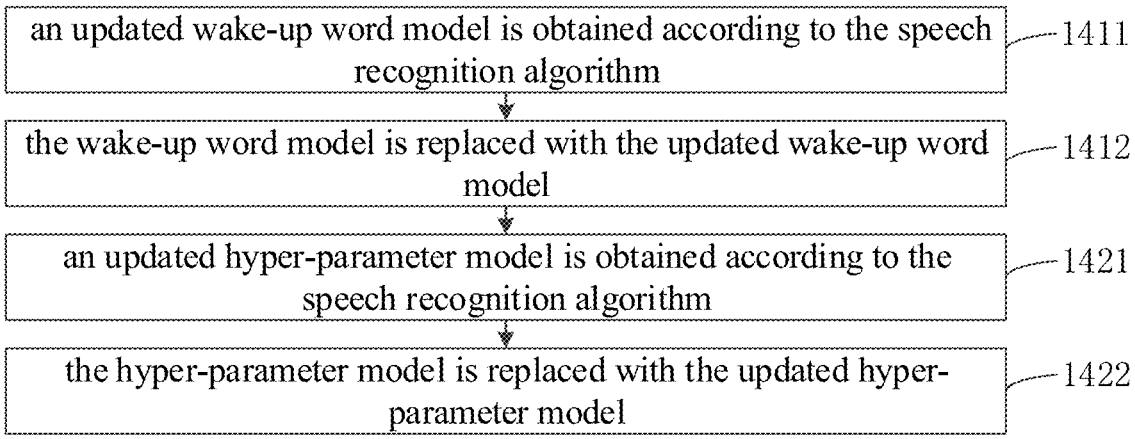
FIG. 6 is a fifth schematic flowchart view of a method for updating a voice recognition model according to an embodiment of the present disclosure.

In some embodiments, as shown in FIG. 6, the operation 141 of updating the wake-up word model according to the speech recognition algorithm includes the following operations.

In operation 1411, an updated wake-up word model is obtained according to the speech recognition algorithm.

In operation 1412, the wake-up word model is replaced with the updated wake-up word model.

Operation 142 of updating the hyper-parameter model according to the speech recognition algorithm includes the following operations:

In operation 1421, an updated hyper-parameter model is obtained according to the speech recognition algorithm.

In operation 1422, the hyper-parameter model is replaced with the updated hyper-parameter model.

Wherein, the speech recognition algorithm can include the wake-up word model and the hyper-parameter model. The updated speech recognition algorithm can include the updated wake-up word model and the updated hyper-parameter model after the speech recognition algorithm is updated.

The electronic device can obtain the updated wake-up word model according to the speech recognition algorithm, and replace the wake-up word model in the first speech recognition model with the updated wake-up word model. The electronic device can obtain the updated hyper-parameter model according to the speech recognition algorithm, and replace the hyper-parameter model in the first speech recognition model with the updated hyper-parameter model. The electronic device completes the updating of the first speech recognition model.

Figure 7:
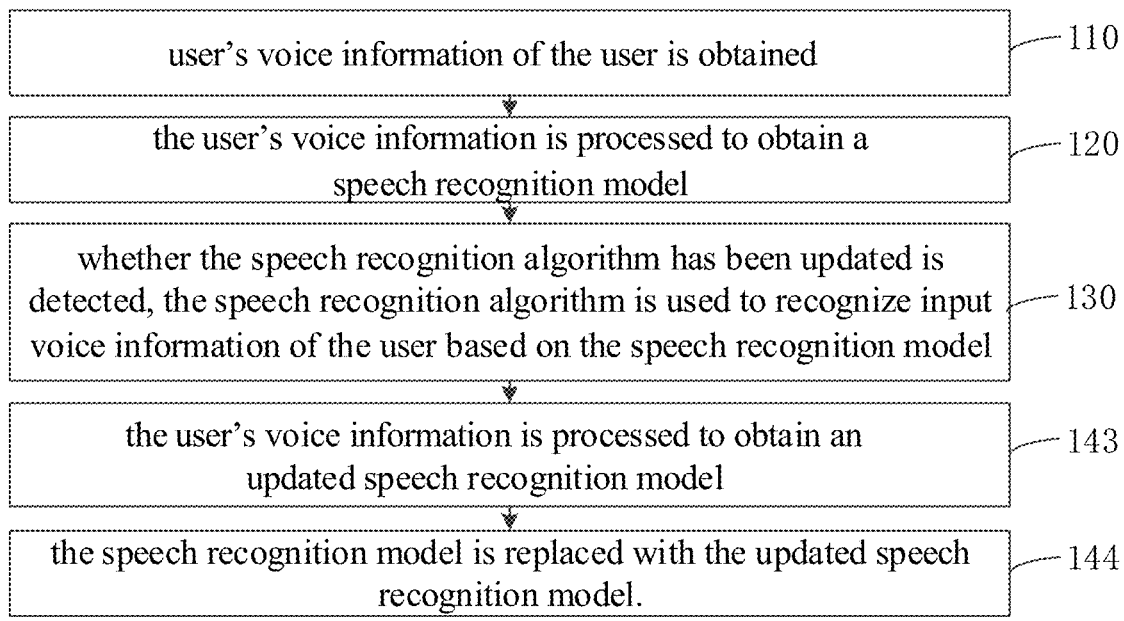
FIG. 7 is a sixth schematic flowchart view of a method for updating a voice recognition model according to an embodiment of the present disclosure.

In some embodiments, as shown in FIG. 7, operation 140 of updating the first speech recognition model includes the following operations.

In operation 143, the user's voice information is processed to obtain an updated speech recognition model.

In operation 144, the speech recognition model is replaced with the updated speech recognition model.

Wherein, the user's voice information can be stored in the electronic device after the user's voice information is obtained by the electronic device. For example, the obtained user's voice information can be stored in a non-volatile memory of the electronic device.

When the electronic device determines that the speech recognition algorithm has been updated, the electronic device can read the user's voice information from the electronic device, and process the user's voice information to obtain the updated speech recognition model. The electronic device replaces the speech recognition model with the updated speech recognition model to update the speech recognition model. In some embodiments, the updated speech recognition model can be obtained by processing the user's voice information based on the updated speech recognition algorithm.

In the specific implementation, the present disclosure is not limited by the execution order of the various operations described, and some operations can be performed in other orders or simultaneously without conflict.

It can be seen from the above that the method for updating a speech recognition model provided by the embodiments of the present disclosure includes: obtaining user's voice information of the user; processing the user's voice information to obtain the speech recognition model; and detecting whether the speech recognition algorithm is updated. Wherein, the input voice information of the user is recognized by the electronic device based on the speech recognition algorithm and the speech recognition model, and when the speech recognition algorithm has been updated, the electronic device updates the speech recognition model. In the method for updating a speech recognition model, when the electronic device detects that the speech recognition algorithm has been updated, the electronic device can update the speech recognition model, so that the matching degree between the speech recognition model and the speech recognition algorithm can be higher, the number of speech recognition failure is reduced, and thereby the accuracy of the speech recognition of the electronic device can be improved.

The present disclosure provides an embodiment of a device for a speech recognition model updating, which can be integrated in electronic devices. The electronic devices can be smart phones, tablets, game devices, AR (Augmented Reality) devices, automobiles, data storage devices, audio playback devices, video playback devices, laptop computers, desktop computing devices and so on.

Figure 8:
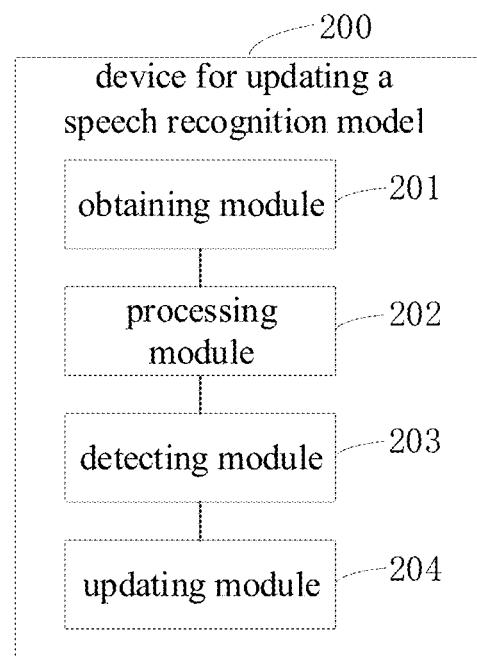
FIG. 8 is a schematic structural view of a device for updating a voice recognition model according to an embodiment of the present disclosure.

As shown in FIG. 8, the device for updating a speech recognition model can include an obtaining module 201, a processing module 202, a detecting module 203, and an updating module 204.

The obtaining module 201 is configured to obtain a user's voice information of the user.

Wherein, the electronic device includes the microphone, and the microphone can be configured to obtain the user's voice information.

The electronic device can prompt the user to input a piece of voice information as the user's voice information when the speech recognition function or the speech recognition application of the electronic device is first activated. The obtaining module 201 can obtain the user's voice information by the microphone.

Wherein, the user's voice information can be voice information corresponding to a preset paragraph of text. For example, the user's voice information can include the sentences such as "the weather is really good today", "this is my smartphone" and so on.

For example, when the user first uses the speech recognition function or the speech recognition application of the electronic device, the electronic device can prompt the user to read "the weather is really good today", which is displayed on the display screen. The obtaining module 20 collects the voice information reading by the user as the user's voice information. In addition, the electronic device can guide the user to read the preset text many times, so that the voice information the user reads many times can be collected as the user's voice information.

The processing module 202 is configured to process the user's voice information to obtain a speech recognition model.

The processing module 202 can process the user's voice information to obtain the speech recognition model after the obtaining module 201 obtains the user's voice information of the user.

For example, the processing module 202 can extract voiceprint features of the user from the user's voice information, and train the voiceprint features based on a preset training algorithm to obtain the speech recognition model. Thus, the speech recognition model is related to the voiceprint features of the user and can be used to recognize the input voice information of the user.

The detecting module 203 is configured to detect whether the speech recognition algorithm has been updated, the speech recognition algorithm is used to recognize input voice information of the user based on the speech recognition model.

The speech recognition algorithm is set in the electronic device. The speech recognition algorithm is used to recognize input voice information of the user based on the speech recognition model. That is, the electronic device can recognize the input voice information of the user based on the speech recognition algorithm and the speech recognition model.

For example, when a user wants to control the electronic device by voice, the user inputs a piece of voice information to the electronic device, such as "open wechat". The electronic device obtains the voice information of the user and compares the voice information with the speech recognition model to determine whether the voice information matches the speech recognition model or not. When the voice information matches the speech recognition model, it indicates that the electronic device recognizes the voice information of the user successfully. The electronic device can perform operation instructions corresponding to the voice information.

Wherein, the speech recognition algorithm can be embedded in an operating system of the electronic device. For example, the speech recognition algorithm can be implemented by some code included in the operating system. Thereby, the speech recognition algorithm may also be different when the operating system version is different. That is, there is a case where the speech recognition algorithm is updated.

The speech recognition algorithm can also exist independently in the application of the electronic device. For example, an application for speech recognition can be installed in the electronic device, and the speech recognition algorithm can be implemented by some code included in the speech recognition application. The speech recognition algorithm can also be different when the version of the speech recognition application is different.

In this embodiment of the present disclosure, the detecting module 203 can detect whether the speech recognition algorithm is updated. For example, the detecting module 203 can detect whether the speech recognition algorithm is updated by detecting whether the operating system has been updated or the speech recognition application has been updated.

The updating module 204 is configured to update the speech recognition model when the speech recognition algorithm has been updated.

Wherein, the speech recognition model can be updated by the updating module 204 when the detecting module 203 detects that the speech recognition algorithm is updated. So that the matching degree between the speech recognition model and the speech recognition algorithm can be higher, and the number of speech recognition failures is reduced, and the accuracy of speech recognition of the electronic device is improved.

In some embodiments, the detecting module 203 can be configured to perform the following operations.

Configuration information of the operating system is obtained, the configuration information includes the parameter value, the parameter value is used to indicate whether the operating system has been updated or the speech recognition application has been updated.

Whether the operating system has been updated or the speech recognition application has been updated is determined, based on the parameter value.

If the operating system has been updated or the speech recognition application has been updated, it is determined that the speech recognition algorithm has been updated.

Wherein, the configuration information is set in the operating system of the electronic device. The configuration information can be stored in the operating system as a separate configuration file. The configuration information includes the parameter value, the parameter value can be used to indicate whether the operating system has been updated or the speech recognition application has been updated.

For example, the parameter value can be used to indicate whether the operating system is updated. When the parameter value is 1, it indicates that the operating system has been updated; when the parameter value is 0, it indicates that the operating system is not updated.

As another example, the parameter value can be used to indicate whether the speech recognition application is updated. When the parameter value is 1, it indicates that the speech recognition application has been updated; when the parameter value is 0, it indicates that the speech recognition application is not updated.

The detecting module 203 can obtain the configuration information of the operating system and determine whether the operating system has been updated or the speech recognition application has been updated, according to the parameter value in the configuration information.

For example, when the parameter value is used to indicate whether the operating system is updated, the detecting module 203 can determine that the operating system has been updated when the parameter value in the configuration information obtained by the detecting module 203 is 1. When the parameter value is used to indicate whether the speech recognition application is updated, the detecting module 203 can determine the speech recognition application has been updated when the parameter value in the configuration information obtained by the detecting module 203 is 1.

When the detecting module 203 determines that the operating system or the speech recognition application has been updated, the detecting module 203 can determine that the speech recognition algorithm has been updated.

In some embodiments, the detecting module 203 can be configured to perform the following operations.

A version information of the operating system or a version information of the speech recognition application is obtained.

Whether a version information of the speech recognition model corresponds to the version information of the operating system or the version information of the speech recognition application is determined.

The detecting module 203 determines that the speech recognition algorithm has been updated, when the version information of the speech recognition model does not correspond to the version information of the operating system or the version information of the speech recognition application.

Each time the operating system of the electronic device is updated, the electronic device can store the version information of the operating system in the operating system. Each time the speech recognition application is updated, the electronic device can also store the version information of the speech recognition application in the operating system.

When the processing module 202 processes the user's voice information of the user and obtains the speech recognition model, the version information of the speech recognition model can be written in the speech recognition model. The version information of the speech recognition model can correspond to the version information of the operating system when the electronic device performs the user's voice information processing. For example, the version information of the operating system of the electronic device is 1.0.0.0, and the version information of the speech recognition model may be 1.0.0.1. The version information of the speech recognition model may also correspond to the version information of the speech recognition application when the electronic device performs the user's voice information processing. For example, the version information of the speech recognition application in the electronic device is 1.0.2.0, and the version information of the speech recognition model can be 1.0.2.1.

The detecting module 203 can obtain the version information of the operating system or the version information of the speech recognition application, compare the version information of the speech recognition model with the version information of the operating system or the version information of the speech recognition application, in order to determine whether the version information of the speech recognition model corresponds to the version information of the operating system or the version information of the speech recognition application.

If the version information of the speech recognition model corresponds to the version information of the operating system, or the version information of the speech recognition model corresponds to the version information of the speech recognition application, it indicates that the operating system or the speech recognition application has not been updated after the generation of the speech recognition model.

If the version information of the speech recognition model does not correspond to the version information of the operating system, or the version information of the speech recognition model does not correspond to the version information of the speech recognition application, it indicates that the operating system has been updated or the speech recognition application has been updated after the generation of the speech recognition mode. At this time, the detecting module 203 can determine that the speech recognition algorithm has been updated.

In some embodiments, the updating module 204 can be configured to perform the following operations.

A wake-up word model is updated according to the speech recognition algorithm.

A hyper-parameter model is updated according to the speech recognition algorithm, to update the speech recognition model.

Wherein, the speech recognition model includes a wake-up word model and a hyper-parameter model. The wake-up word model can include multiple wake-up words. The wake-up word is used to match the input voice information of the user, so that the electronic device performs the operation instructions in the input voice information of the user. The hyper-parameter model can include multiple parameters.

Furthermore, the speech recognition model can also include a voiceprint feature model. The voiceprint feature model includes voiceprint features of the user.

When the detecting module 203 determines that the speech recognition algorithm has been updated, the updating module 204 updates the wake-up word model according to the speech recognition algorithm, and updates the hyper-parameter model according to the speech recognition algorithm, so as to implement the updating of the speech recognition model. At this time, the updating module 204 may not update the voiceprint feature model, that is, retain the voiceprint feature model in the speech recognition model.

In some embodiments, the updating module 204 can be configured to perform the following operations when the wake-up word model is updated according to the speech recognition algorithm.

A updated wake-up word model is obtained according to the speech recognition algorithm.

The wake-up word model is replaced with the updated wake-up word model.

The updating module 204 can be configured to perform the following operations when the hyper-parameter model is updated according to the speech recognition algorithm.

A updated hyper-parameter model is obtained according to the speech recognition algorithm.

The hyper-parameter model is replaced with the updated hyper-parameter model.

Wherein, the speech recognition algorithm can include the wake-up word model and the hyper-parameter model. The updated speech recognition algorithm can include the updated wake-up word model and the updated hyper-parameter model after the speech recognition algorithm is updated.

The updating module 204 can obtain the updated wake-up word model according to the speech recognition algorithm, and replace the wake-up word model in the speech recognition model with the updated wake-up word model. The updating module 204 can obtain the updated hyper-parameter model according to the speech recognition algorithm, and replace the hyper-parameter model in the speech recognition model with the updated hyper-parameter model. The updating module 204 completes the updating of the speech recognition model.

In some embodiments, the updating module 204 can be configured to perform the following operations.

The user's voice information is processed to obtain the updated speech recognition model.

The speech recognition model is replaced with the updated speech recognition model.

Wherein, the user's voice information can be stored in the electronic device after the user's voice information is obtained by the obtaining module 201. For example, the obtained user's voice information can be stored in a non-volatile memory of the electronic device.

When the detecting module 203 determines that the speech recognition algorithm is updated, the updating module 204 can extract the user's voice information from the electronic device, and process the user's voice information to obtain the updated speech recognition model. The updating module 204 replaces the speech recognition model with the updated speech recognition model to update the speech recognition model.

In the specific implementation, each of the above modules may be implemented as a separate entity, or may be implemented in any combination as one or several entities.

It can be seen from the above that in the device for updating a speech recognition model provided by the embodiments of the present disclosure, the obtaining module 201 obtains user's voice information of the user; the processing module 202 processes the user's voice information to obtain the speech recognition model; and the detecting module 203 detectes whether the speech recognition algorithm is updated. Wherein, the input voice information of the user is recognized by the electronic device based on the speech recognition algorithm and the speech recognition model, and when the speech recognition algorithm has been updated, the updating module 204 updates the speech recognition model. In the device for updating a speech recognition model, when it is detected that the speech recognition algorithm has been updated, the speech recognition model can be updated, so that the matching degree between the speech recognition model and the speech recognition algorithm can be higher, the number of speech recognition failure is reduced, and thereby the accuracy of the speech recognition of the electronic device can be improved.

Figure 9:
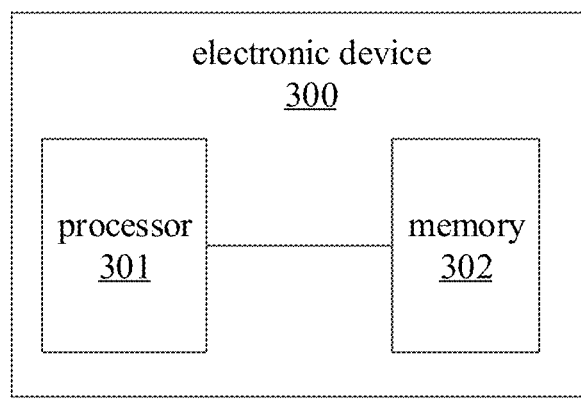
FIG. 9 is a schematic structural view of an electronic device according to an embodiment of the present disclosure.

The embodiments of the present disclosure also provide an electronic device. The electronic device may be a smart phone, a tablet and so on. As illustrated in FIG. 9, the electronic device 300 includes a processor 301 and a memory 302. Wherein, the processor 301 and the memory 302 are electrically coupled to each other.

The processor 301 is a control center of the electronic device 300. The processor connects various portions of the electronic device using various interfaces and lines, performs various functions and processing data of the electronic device by running or calling a computer program stored in the memory 302, and calling data stored in the memory 302, thereby monitoring the electronic device.

In this embodiment, the processor 301 in the electronic device 300 loads the instructions corresponding to the processes of one or more computer programs into the memory 302 according to the following operations, and the computer programs stored in the memory 302 can be performed by the processor 301, to implement various functions as follows.

A user's voice information is obtained.

The user's voice information is processed to obtain a speech recognition model.

Whether the speech recognition algorithm has been updated is detected, wherein the processor is configured to recognize input voice information of the user based on the speech recognition algorithm and the speech recognition model.

In some embodiments, when detecting whether the speech recognition algorithm has been updated, the processor 301 performs the following operations.

Configuration information of the operating system is obtained, the configuration information includes the parameter value, the parameter value is used to indicate whether the operating system has been updated or the speech recognition application has been updated.

Whether the operating system has been updated or the speech recognition application has been updated is determined, according to the parameter value.

When the operating system has been updated or the speech recognition application has been updated, it is determined that that the speech recognition algorithm has been updated.

In some embodiments, when detecting whether the speech recognition algorithm has been updated, the processor 301 performs the following operations.

A version information of the operating system or a version information of the speech recognition application is obtained.

Whether a version information of the speech recognition model corresponds to the version information of the operating system or the version information of the speech recognition application is determined.

It is determined that the speech recognition algorithm has been updated, when the version information of the speech recognition model does not correspond to the version information of the operating system or the version information of the speech recognition application.

In some embodiments, the speech recognition model includes a wake-up word model and a hyper-parameter model. When updating the speech recognition model, the processor 301 includes the following operations.

A wake-up word model is updated according to the speech recognition algorithm.

A hyper-parameter model is updated according to the speech recognition algorithm, to update the speech recognition model.

In some embodiments, when updating the wake-up word model according to the speech recognition algorithm, the processor 301 performs the following operations.

An updated wake-up word model is obtained according to the speech recognition algorithm.

The wake-up word model is replaced with the updated wake-up word model.

When updating the hyper-parameter model according to the speech recognition algorithm, the processor 301 performs the following operations.

An updated hyper-parameter model is obtained according to the speech recognition algorithm.

The hyper-parameter model is replaced with the updated hyper-parameter model.

In some embodiments, when updating the speech recognition model, the processor 301 performs the following operations.

The user's voice information is processed to obtain the updated speech recognition model.

The speech recognition model is replaced with the updated speech recognition model.

The memory 302 can be used to store the computer programs and data. The computer programs stored in the memory 302 contain instructions executable in the processor. The computer programs can be combined into various functional modules. The processor 301 performs various functional applications and data processing by calling the computer programs stored in the memory 302.

Figure 10:
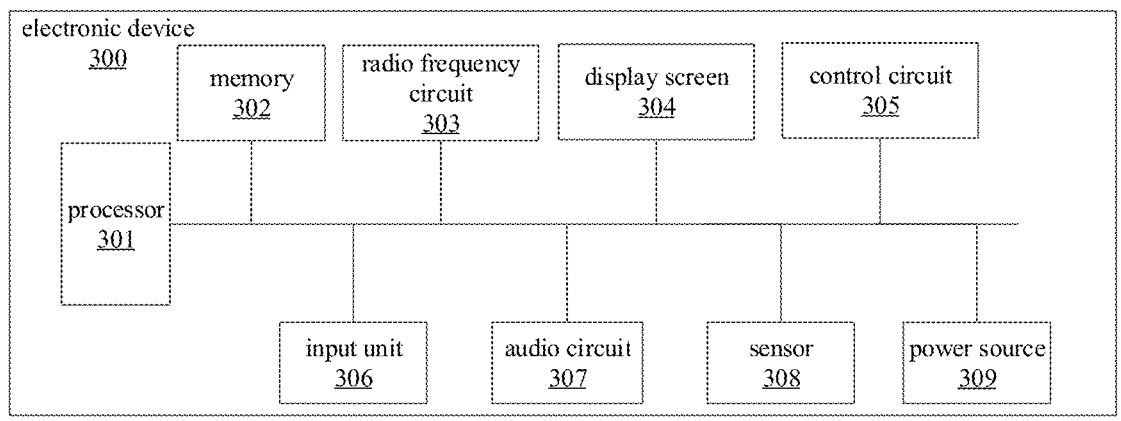
FIG. 10 is another schematic structural view of an electronic device according to an embodiment of the present disclosure.

In some embodiments, as illustrated in FIG. 10, the electronic device 300 further includes a radio frequency circuit 303, a display screen 304, a control circuit 305, an input unit 306, an audio circuit 307, a sensor 308 and a power source 309. Wherein, the processor 301 is electrically coupled to the radio frequency circuit 303, the display screen 304, the control circuit 305, the input unit 306, the audio circuit 307, the sensor 308, and the power source 309, respectively.

The radio frequency circuit 303 is configured to transmit and receive radio frequency signals to communicate with network devices or other electronic devices through wireless communication.

The display screen 304 can be used to display information entered by the user or information provided to the user as well as various graphical user interfaces of the electronic device, the graphical user interfaces can be composed of images, text, icons, video, and any combination thereof.

The control circuit 305 is electrically coupled to the display screen 304 for controlling the display screen 304 to display information.

The input unit 306 can be configured to receive input digits, character information, or user characteristic information (eg, fingerprints), and to generate signal inputs of keyboard, mouse, joystick, optical, or trackball, the signal inputs are related to user settings and function controls. The input unit 306 can include a fingerprint identification module.

The audio circuit 307 can provide an audio interface between the user and the electronic device through a speaker and a microphone. Wherein, the audio circuit 307 includes a microphone. The microphone can be used to obtain user's voice information of the user. The microphone is also used to obtain input voice information of the user during the voice recognition process of the electronic device.

The sensor 308 is used to collect external environmental information. Sensor 308 can include one or more of ambient brightness sensors, acceleration sensors, gyroscopes, and the like.

The power source 309 is used to power various components of electronic device 300. In some embodiments, the power source 309 can be logically coupled to the processor 301 through a power management system to enable functions such as charging management, discharging management, and power management through the power management system.

Although not shown in FIG. 10, the electronic device 300 may further include a camera, a bluetooth module, and the like, and details are not described herein again.

It can be seen from the above, the embodiments of the present disclosure provide an electronic device. The electronic device performs the operations of obtaining user's voice information; processing the user's voice information to obtain the speech recognition model; and detecting whether the speech recognition algorithm is updated. Wherein, the processor recognizes the input voice information of the user based on the speech recognition algorithm and the speech recognition model, and when the speech recognition algorithm has been updated, the processor updates the speech recognition model. In the electronic device, when it is detected that the speech recognition algorithm has been updated, the electronic device can update the speech recognition model, so that the matching degree between the speech recognition model and the speech recognition algorithm can be higher, the number of speech recognition failure is reduced, and thereby the accuracy of the speech recognition of the electronic device can be improved.

The embodiments of the present disclosure provide a storage medium, with a computer program stored therein, wherein any one of the above embodiments is implemented when executing the computer program by a computer.

It should be noted that those skilled in the art can understand that all or part of the various methods of the foregoing embodiments can be completed by computer programs to instruct related hardware. The computer programs may be stored in a computer readable storage medium, which may include, but is not limited to, a read only memory (ROM), a random access memory (RAM), a magnetic disk or an optical disk.

The method for updating a speech recognition model, the device, the storage medium and the electronic device provided by the embodiments of the present disclosure are described in detail above. In the description, the principles and implementations of the present disclosure have been described in specific examples, and the description of the above embodiments is only to assist in understanding the method of the present disclosure and its core idea. In the meantime, those skilled in the art will be able to change the specific embodiments and the scope of the disclosure according to the idea of the present disclosure. In the above, the content of the specification should not be construed as limiting the present disclosure.

What is claimed is:

1. A method for updating a speech recognition model, applied to an electronic device with the speech recognition model stored therein, the speech recognition model being obtained by processing user's voice information of a user with a speech recognition algorithm, the method comprising:

obtaining the user's voice information when a speech recognition function of the electronic device is activated for a first time, extracting voiceprint features of the user from the user's voice information, and training the voiceprint features extracted from the user's voice information with the speech recognition algorithm to obtain the speech recognition model, wherein the speech recognition algorithm is configured to process input voice information of the user to recognize a control instruction from the input voice information when the input voice information matches the speech recognition model;

storing the user's voice information in a non-volatile memory of the electronic device;

detecting whether the speech recognition algorithm has been updated by detecting whether an operating system of the electronic device is updated or whether a speech recognition application installed in the electronic device is updated, wherein the speech recognition algorithm is implemented as codes included in the operating system or the speech recognition application;

in response to detecting that the speech recognition algorithm has been updated, reading the user's voice information that is stored in the non-volatile memory and obtained when the speech recognition function of the electronic device is activated for the first time, extracting the voiceprint features of the user from the read user's voice information, retraining the voiceprint features extracted from the user's voice information with the updated speech recognition algorithm, to obtain an updated speech recognition model, and replacing the speech recognition model with the updated speech recognition model;

obtaining configuration information of the operating system, wherein the configuration information comprises a first parameter value or a second parameter value, the first parameter value is used to indicate whether the operating system has been updated, and the second parameter value is used to indicate whether the speech recognition application has been updated;

determining the values of the first parameter value, and the second parameter value;

determining that the operating system has been updated when the first parameter value is equal to 1;

determining that the speech recognition application has been updated when the second parameter value is equal to 1; and determining that the speech recognition algorithm has been updated in response to determining that the operating system has been updated or the speech recognition application has been updated.

2. The method of claim 1, wherein the electronic device comprises a voice information acquisition module, and the voice information acquisition module is configured to obtain the user's voice information and the input voice information.

3. The method of claim 2, wherein when the speech recognition algorithm is implemented as codes included in the operating system, the detecting whether the speech recognition algorithm has been updated comprises:

obtaining version information of the operating system;

determining whether version information of the speech recognition model corresponds to the version information of the operating system; and determining that the speech recognition algorithm has been updated, in response to determining that the version information of the speech recognition model does not correspond to the version information of the operating system.

4. The method of claim 1, wherein when the speech recognition algorithm is implemented as codes included in the speech recognition application, the detecting whether the speech recognition algorithm has been updated comprises:

obtaining version information of the speech recognition application;

determining whether version information of the speech recognition model corresponds to the version information of the speech recognition application; and determining that the speech recognition algorithm has been updated, in response to determining that the version information of the speech recognition model does not correspond to the version information of the speech recognition application.

5. The method of claim 1, wherein when the speech recognition algorithm is implemented as codes included in the speech recognition application, the detecting whether the speech recognition algorithm has been updated comprises:

detecting whether the speech recognition application has been updated; and determining the speech recognition algorithm has been updated, in response to determining that the speech recognition application has been updated.

6. The method of claim 1, wherein the speech recognition model comprises a wake-up word model and a hyper-parameter model, and the method further comprises:

updating the wake-up word model with the updated speech recognition algorithm to obtain an updated wake-up word model;

replacing the wake-up word model with the updated wake-up word model;

updating the hyper-parameter model with the updated speech recognition algorithm to obtain an updated hyper-parameter model; and replacing the hyper-parameter model with the updated hyper-parameter model, wherein the speech recognition model further comprises a voiceprint feature model, the voiceprint feature model comprises the voiceprint features of the user's voice information, and the voiceprint feature model is unchanged whenever the speech recognition model is updated.

7. The method of claim 1, further comprising:

recognizing the control instruction from the input voice information in response to determining the input voice information matches the speech recognition model.

8. The method of claim 1, wherein the configuration information of the operating system is stored in the operating system as a separate configuration file.

9. The method of claim 1, wherein the obtaining the user's voice information when a speech recognition function of the electronic device is activated for a first time, comprises:

collecting a preset text spoken by the user many times, as the user's voice information, when the speech recognition function of the electronic device is activated for the first time.

10. A non-transitory storage medium, with a computer program and a speech recognition model stored therein, wherein the speech recognition model is obtained by processing user's voice information of a user with a speech recognition algorithm, a method for updating the speech recognition model is implemented when executing the computer program by a computer, the method comprising:

obtaining the user's voice information when a speech recognition function of an electronic device is activated for a first time, extracting voiceprint features of the user from the user's voice information, and training the voiceprint features extracted from the user's voice information with the speech recognition algorithm to obtain the speech recognition model, wherein the speech recognition algorithm is configured to process input voice information of the user to recognize a control instruction from the input voice information when the input voice information matches the speech recognition model;

storing the user's voice information in a non-volatile memory of the electronic device;

detecting whether the speech recognition algorithm has been updated by detecting whether an operating system of the electronic device is updated or whether a speech recognition application installed in the electronic device is updated, wherein the speech recognition algorithm is implemented as codes included in the operating system or the speech recognition application;

in response to detecting that the speech recognition algorithm has been updated, reading the user's voice information that is stored in the non-volatile memory and obtained when the speech recognition function of the electronic device is activated for the first time, extracting the voiceprint features of the user from the read user's voice information, retraining the voiceprint features extracted from the user's voice information with the updated speech recognition algorithm, to obtain an updated speech recognition model, and replacing the speech recognition model with the updated speech recognition model;

obtaining configuration information of the operating system, wherein the configuration information comprises a first parameter value or a second parameter value, the first parameter value is used to indicate whether the operating system has been updated, and the second parameter value is used to indicate whether the speech recognition application has been updated;

determining the values of the first parameter value, and the second parameter value;

determining that the operating system has been updated when the first parameter value is equal to 1;

determining that the speech recognition application has been updated when the second parameter value is equal to 1; and determining that the speech recognition algorithm has been updated in response to determining that the operating system has been updated or the speech recognition application has been updated.

11. The non-transitory storage medium of claim 10, wherein the speech recognition model comprises a wake-up word model and a hyper-parameter model, and the method further comprises:

updating the wake-up word model with the updated speech recognition algorithm to obtain an updated wake-up word model;

replacing the wake-up word model with the updated wake-up word model;

updating the hyper-parameter model with the updated speech recognition algorithm to obtain an updated hyper-parameter model; and replacing the hyper-parameter model with the updated hyper-parameter model, wherein the speech recognition model further comprises a voiceprint feature model, the voiceprint feature model comprises the voiceprint features of the user's voice information, and the voiceprint feature model is unchanged whenever the speech recognition model is updated.

12. An electronic device, comprising a processor and a memory, a computer program and a speech recognition model being stored in the memory, the speech recognition model being obtained by processing user's voice information of a user with a speech recognition algorithm, the processor being configured to perform a method for updating the speech recognition model by calling the computer program stored in the memory, the method comprising:

obtaining the user's voice information when a speech recognition function of the electronic device is activated for a first time, extracting voiceprint features of the user from the user's voice information, and training the voiceprint features extracted from the user's voice information with the speech recognition algorithm to obtain the speech recognition model, wherein the speech recognition algorithm is configured to process input voice information of the user to recognize a control instruction from the input voice information when the input voice information matches the speech recognition model;

storing the user's voice information in a non-volatile memory of the electronic device;

detecting whether the speech recognition algorithm has been updated by detecting whether an operating system of the electronic device is updated or whether a speech recognition application installed in the electronic device is updated, wherein the speech recognition algorithm is implemented as codes included in the operating system or the speech recognition application;

in response to detecting that the speech recognition algorithm has been updated, reading the user's voice information that is stored in the non-volatile memory and obtained when the speech recognition function of the electronic device is activated for the first time, extracting the voiceprint features of the user from the read user's voice information, retraining the voiceprint features extracted from the user's voice information with the updated speech recognition algorithm, to obtain an updated speech recognition model, and replacing the speech recognition model with the updated speech recognition model;

obtaining configuration information of the operating system, wherein the configuration information comprises a first parameter value or a second parameter value, the first parameter value is used to indicate whether the operating system has been updated, and the second parameter value is used to indicate whether the speech recognition application has been updated;

determining the values of the first parameter value, and the second parameter value;

determining that the operating system has been updated when the first parameter value is equal to 1;

determining that the speech recognition application has been updated when the second parameter value is equal to 1; and determining that the speech recognition algorithm has been updated in response to determining that the operating system has been updated or the speech recognition application has been updated.

13. The electronic device of claim 12, further comprising a microphone electrically coupled to the processor, wherein the microphone is configured to acquire the user's voice information and the input voice information.

14. The electronic device of claim 12, wherein when the speech recognition algorithm is implemented as codes included in the operating system, the detecting whether the speech recognition algorithm has been updated comprises:

obtaining version information of the operating system of the electronic device;

determining whether version information of the speech recognition model corresponds to the version information of the operating system; and determining that the speech recognition algorithm has been updated, in response to determining that the version information of the speech recognition model does not correspond to the version information of the operating system.

15. The electronic device of claim 12, wherein when the speech recognition algorithm is implemented as codes included in the speech recognition application, the detecting whether the speech recognition algorithm has been updated comprises:

obtaining version information of the speech recognition application;

determining whether version information of the speech recognition model corresponds to the version information of the speech recognition application; and determining that the speech recognition algorithm has been updated, in response to determining that the version information of the speech recognition model does not correspond to the version information of the speech recognition application.

16. The electronic device of claim 12, wherein the speech recognition model comprises a wake-up word model and a hyper-parameter model, and the method further comprises:

updating the wake-up word model with the updated speech recognition algorithm to obtain an updated wake-up word model;

replacing the wake-up word model with the updated wake-up word model;

updating the hyper-parameter model with the updated speech recognition algorithm to obtain an updated hyper-parameter model; and replacing the hyper-parameter model with the updated hyper-parameter model, wherein the speech recognition model further comprises a voiceprint feature model, the voiceprint feature model comprises the voiceprint features of the user's voice information, and the voiceprint feature model is unchanged whenever the speech recognition model is updated.

17. The electronic device of claim 12, wherein the obtaining the user's voice information when a speech recognition function of the electronic device is activated for a first time, comprises:

collecting a preset text spoken by the user many times, as the user's voice information, when the speech recognition function of the electronic device is activated for the first time.

\* \* \* \* \*